United States Patent
Weinkoetz et al.

(10) Patent No.: US 11,739,235 B2
(45) Date of Patent: Aug. 29, 2023

(54) PROCESS FOR PREPARING LIQUID COMPOSITIONS OF ETHERIFIED MELAMINE FORMALDEHYDE RESINS

(71) Applicant: BASF SE, Ludwigshafen am Rhein (DE)

(72) Inventors: Stephan Weinkoetz, Ludwigshafen (DE); Dieter Weilacher, Ludwigshafen (DE); Guenter Scherr, Ludwigshafen (DE); Jens Steinbeck, Ludwigshafen (DE); Evelyn Fuchs, Ludwigshafen (DE); Ralf Strohmeier, Ludwigshafen (DE); Daniel Flojhar, Ludwigshafen (DE)

(73) Assignee: BASF SE (DE)

(*) Notice: Subject to any disclaimer, the term of this patent is extended or adjusted under 35 U.S.C. 154(b) by 650 days.

(21) Appl. No.: 16/472,041

(22) PCT Filed: Dec. 20, 2017

(86) PCT No.: PCT/EP2017/083710
§ 371 (c)(1),
(2) Date: Jun. 20, 2019

(87) PCT Pub. No.: WO2018/115806
PCT Pub. Date: Jun. 28, 2018

(65) Prior Publication Data
US 2020/0095453 A1 Mar. 26, 2020

(30) Foreign Application Priority Data
Dec. 21, 2016 (EP) .................... 16205860

(51) Int. Cl.
*C09D 161/34* (2006.01)
*C09D 7/20* (2018.01)
*C08G 14/02* (2006.01)

(52) U.S. Cl.
CPC ........... *C09D 161/34* (2013.01); *C08G 14/02* (2013.01); *C09D 7/20* (2018.01)

(58) Field of Classification Search
CPC ......... C09D 161/34; C09D 7/20; C08G 14/02
USPC ....................................... 524/315
See application file for complete search history.

(56) References Cited

U.S. PATENT DOCUMENTS

| 2,197,357 | A | 4/1940 | Widmer et al. |
| 3,488,350 | A | 1/1970 | Donaldson et al. |
| 4,081,426 | A | 3/1978 | Michel et al. |
| 4,101,520 | A * | 7/1978 | Boldizar ............... C08G 12/32 524/512 |
| 4,293,692 | A | 10/1981 | Pai et al. |
| 4,425,466 | A | 1/1984 | Santer et al. |
| 6,261,483 | B1 | 7/2001 | Frank et al. |
| 6,579,964 | B2 | 6/2003 | Wonner et al. |
| 2014/0302241 | A1 | 10/2014 | Wu et al. |

FOREIGN PATENT DOCUMENTS

| CN | 101463117 A | 6/2009 |
| EP | 0176709 A1 | 4/1986 |
| EP | 0 385 225 A2 | 9/1990 |
| EP | 1 607 391 A1 | 12/2005 |
| GB | 1508103 A | 4/1978 |
| KR | 10-1999-0040259 A | 6/1999 |
| WO | 94/10231 A1 | 5/1994 |
| WO | WO 2005/068441 A1 | 6/2005 |
| WO | WO 2007/065922 A1 | 6/2007 |
| WO | WO 2013/057303 A2 | 4/2013 |
| WO | 2016/072167 A1 | 5/2016 |

OTHER PUBLICATIONS

U.S. Appl. No. 15/562,078, filed Sep. 27, 2017, US 2018-0071945 A1, Stephan Weinkotz.
U.S. Pat. No. 10,399,246, Sep. 27, 2017, US 2018-0071946 A1, Jean-Pierre Berkan Lindner.
U.S. Appl. No. 16/071,120, filed Jul. 19, 2018, Gabor Boerzsoenyi.
U.S. Appl. No. 16/335,285, filed Mar. 21, 2019, Stephan Weinkotz.
International Search Report dated Mar. 8, 2018 in PCT/EP2017/083710, 4 pages
"Technical Data Sheet Resimene 755", https://www.ineos.com/show-document/Render/?grade=RESIMENE+755&bu=INEOS+Melamines &documentType=Technical+Data+Sheet&docLanguage=EN, INEOS Melamines, XP055406731, 2011, 2 pages.

* cited by examiner

*Primary Examiner* — Kelechi C Egwim
(74) *Attorney, Agent, or Firm* — Faegre Drinker Biddle & Reath LLP

(57) ABSTRACT

The present invention relates to a process for preparing liquid compositions of etherified melamine formaldehyde resins, namely melamine formaldehyde resins etherified with a primary $C_1$-$C_6$-alkanol, which have low formaldehyde contents. The invention also relates to such liquid compositions of etherified melamine formaldehyde resins having a content of free formaldehyde of less than 0.3% by weight. The liquid compositions of etherified melamine formaldehyde resins are useful as crosslinking agents in coating compositions.

12 Claims, No Drawings

PROCESS FOR PREPARING LIQUID COMPOSITIONS OF ETHERIFIED MELAMINE FORMALDEHYDE RESINS

The present invention relates to a process for preparing liquid compositions of etherified melamine formaldehyde resins, namely melamine formaldehyde resins etherified with a primary $C_1$-$C_6$-alkanol, which have low formaldehyde contents. The invention also relates to such liquid compositions of etherified melamine formaldehyde resins having a content of free formaldehyde of less than 0.3% by weight. The liquid compositions of etherified melamine formaldehyde resins are useful as crosslinking agents in coating compositions.

Etherified melamine formaldehyde resins are frequently used as crosslinking agents in coating compositions containing crosslinkable binders, in particular for durable lacquers in the field of automotive, appliances, coil coating and can coating, for the production of pressed mats, as a constituent of watertight adhesives for gluing veneer, in the production of laminates, edge bands and in surface shaping of sheet material. Etherified melamine formaldehyde resins are also used in the paper industry for impregnating and coating of paper.

Etherified melamine formaldehyde resins are known for long time and are described, for example, in Houben-Weyl, Methoden der organischen Chemie, Volume XIV-2, 1963, pages 319 to 402, Ullmann's Encyclopäadie der Technischen Chemie, 1953, Volume 3, pages 487 to 489 and in several patent references, such as U.S. Pat. Nos. 2,197,357, 3,488,350, EP 385225 and the references cited therein.

Etherified melamine formaldehyde resins are prepared by reacting melamine, i.e. 2,4,6-triamino-s-triazine, with formaldehyde and a lower alkanol, in particular a primary $C_1$-$C_6$-alkanol, such as methanol or n-butanol. Thereby, the formaldehyde reacts with the primary amino groups of the melamine to form semi-aminal groups (methylolation step), i.e. groups of the formulae $NHCH_2OH$ and $N(CH_2OH)_2$ (also termed N-methylol groups), which themselves react with the alkanol to form ether groups (etherification step), i.e. to form etherified methylol groups of the formulae $NHCH_2OR$, $N(CH_2OH)(CH_2OR)$ and $N(CH_2OR)_2$, respectively, where R corresponds to the alkyl radical of the alkanol. Apart from this, the formaldehyde may react with the semi-aminal groups to form N bound oligoacetal groups $CH_2[O-CH_2]_n-OH$ or $CH_2[O-CH_2]_n-OR$, or formaldehyde may react with two amino groups of two melamine molecules to form a methylene bridge or two aminal groups may react to form $CH_2OCH_2$ groups linking two amino groups of two melamine molecules. Depending on the reaction conditions, the type and relative amounts of functional groups formed may vary.

The etherification of the N-methylol groups with the alkanol is an equilibrium reaction, where water is formed. In addition, water is introduced in the reaction mixture, because formaldehyde is normally used as an aqueous solution. In order to push the equilibrium to the product side, an excess of the alkanol, based on the desired stoichiometry of the final product, is used and, at the end of the reaction, water will be removed, usually by distillation together with the excess of alkanol used for etherification. Thereby, a concentrated melamine formaldehyde resin composition is obtained, which is normally diluted with the $C_1$-$C_6$-alkanol in order to adjust the viscosity of the etherified melamine formaldehyde resin composition. During the distillation, fission of the etherified N-methylol groups may occur resulting in the release of formaldehyde. What is more, the dilution of the concentrated melamine formaldehyde resin composition with the $C_1$-$C_6$-alkanol usually results in a release of formaldehyde and thus in an increase of free formaldehyde in the liquid composition.

The economically most relevant etherified melamine formaldehyde resins may be classified into three different types 1, 2a and 2b, depending on the molar ratio of melamine:formaldehyde:alkanol in the final product:
1. Highly methylolated and highly alkylated melamine formaldehyde resins (hereinafter type 1 resins). The molar ratio of melamine:formaldehyde:alkanol in the final product is frequently 1:>5.4:>4.5;
2. Partially methylolated and partially or highly alkylated melamine formaldehyde resins (type 2 resins). The molar ratio of melamine:formaldehyde:alkanol in the final product is frequently 1:2.4-5.4:>2-4.5. Type 2 resins may be subdivided into the following subgroups:
   a) high imino types having a high degree of alkylation with ≥70% of etherified methylol groups (type 2a resins) and
   b) methylol types having a lower degree of alkylation with <70% of etherified methylol groups (type 2b resins).

Apart from the etherified melamine formaldehyde resin types 1, 2a and 2b, low methylolated melamine formaldehyde resins, so-called melamine formaldehyde condensates, are known.

Type 1 resins have a lower viscosity and lower reactivity than type 2 resins. Therefore, it is principally possible to reduce the formaldehyde content to values below 0.3% by weight by extensive removal of volatiles by distillation. However, extensive removal of volatiles distillation will exert thermal stress to the resin resulting in an increase in molecular weight and increasing viscosity, which is undesirable. High imino type resins 2a as well as methylol type resins 2b in turn have a higher viscosity and higher reactivity. Due to the higher viscosity, it is not possible so far to reduce the formaldehyde concentration in liquid melamine formaldehyde resins to formaldehyde concentrations below 0.4% by weight, in particular less than 0.3% by weight or even below 0.2% by weight or 0.1% by weight without significant loss of reactivity.

U.S. Pat. No. 4,081,426 describes a process for the preparation of etherified melamine formaldehyde resins by reacting a mixture of melamine, formaldehyde, alkanol and water under acidic conditions.

U.S. Pat. No. 4,425,466 describes a process for the preparation of etherified melamine formaldehyde resins by first reacting a mixture of melamine, formaldehyde, alkanol and water under alkaline conditions followed by reacting the primary reaction mixture under acidic conditions.

U.S. Pat. No. 4,101,520 relates to methylated, methylolated melamine compositions having both methoxymethyl groups, non etherfied methylol groups and NH groups. The melamine compositions are prepared by initially reacting melamine and formaldehyde and optionally methanol at a pH in the range of 8 to 10.5 to achieve methylolation. Then the pH is lowered to a pH of below pH 5 and methylation is achieved by reacting the methylolated melamine in the presence of at least 8 mol methanol per 1 mol of melamine. Excess methanol and water is removed at pH>7 and then the methylation is completed by reacting the intermediate with further methanol at pH<5.

WO 2007/065922 describes the process for the preparation of etherified melamine formaldehyde resins by first reacting in a mixture of melamine and formaldehyde under alkaline conditions followed by reaction of the obtained methylolated product with an excess of alkanol, such as methanol under acidic conditions and subsequent removal of excess alkanol by distillation. The obtained product is again reacted with the alkanol and the distillation is also repeated. Thereby, highly methylolated and highly etherified products are obtained.

EP 1607391 describes a continuous process for preparing hexamethylolmelamine, which is reacted in a subsequent step under acidic conditions with a large excess of methanol, followed by neutralization of the mixture and almost complete removal of the volatiles to obtain hexamethoxymethyl melamine (type 1 resin). Thereby, most of the formaldehyde is also removed. However, acceptable concentrations of free formaldehyde are only achieved, if the methanol is almost completely removed. The problems associated with dilution were not recognized.

WO 2013/057303 describes a process for preparing highly methylolated and highly etherified melamine formaldehyde resins by a two-step process, where in the first step melamine, formaldehyde, water and ethanol are reacted under alkaline conditions followed by a second step, where the intermediate hexaalkoxymethyl melamine is reacted with further alkanol under acidic conditions followed by removal of volatiles and filtration of the product to yield an oligomeric solid product having a low content of free formaldehyde. This process, however, is limited to preparation of etherified melamine formaldehyde type 1 resins. Moreover, the problems associated with dilution were not recognized.

Therefore, it is an object of the present invention to provide a process for preparing liquid compositions of etherified melamine formaldehyde resins etherified with a primary $C_1$-$C_6$-alkanol, which process results in resins having a low formaldehyde content of preferably below 0.4% by weight, in particular below 0.3% by weight or even below 0.2% by weight or below 0.1% by weight. In particular, this object should be achieved without need for excessive removal of volatiles, which in turn may result in a significant loss of reactivity. The process should be particularly suitable for preparing partially methylolated and partially or highly alkylated etherified melamine formaldehyde resins (type 2a and 2b resins, respectively) having low contents of free formaldehyde.

It was now surprisingly found that this object is achieved by the process as defined herein, which comprises the preparation of etherified melamine formaldehyde resins by analogy to the methods of prior art including the steps of preparation (step i), removal of volatiles by distillation (step ii) and dilution with solvent (step iii), where additionally one or both of the following two measures a) and b) are taken:

a) Measure a) includes the addition of water or a mixture of water and at least one organic solvent, selected from the group consisting of water-miscible organic solvents B as defined herein and the primary $C_1$-$C_6$-alkanols and mixtures thereof, to the concentrated composition of the etherified melamine formaldehyde resin obtained after having distilled off at least the major portion of the unreacted primary $C_1$-$C_6$-alkanol, unreacted formaldehyde and water and removing at least the major portion of the added water by evaporation under reduced pressure;

b) According to measure b) the solvent used for diluting the concentrated composition of the etherified melamine formaldehyde resin in step iii. comprises at least 50% by weight, based on the total weight of solvent used, of at least one organic solvent B as defined herein.

Both measures a) and b) allow for efficient reduction of the concentration of free formaldehyde in the liquid compositions of the etherified melamine formaldehyde resins. It is believed that measure a) alone efficiently reduces the concentration of free formaldehyde after distillation, while solely taking measure b) efficiently avoids an increase of the concentration of free formaldehyde upon dilution. Performing both measures, in particular successively a) and b), will result in concentrations of free formaldehyde of below 0.2% by weight, in particular below 0.1% by weight.

Therefore, the present invention relates to a process for preparing a liquid composition of an etherified melamine formaldehyde resin, which comprises the following steps:

i. reacting melamine, formaldehyde and a primary $C_1$-$C_6$-alkanol at least temporarily, i.e. at least for a certain period of time, under acidic conditions in the presence of an excess of the primary $C_1$-$C_6$-alkanol, to obtain a mixture of the etherified melamine formaldehyde resin, water, unreacted formaldehyde and unreacted primary $C_1$-$C_6$-alkanol;

ii. distilling off at least the major portion of the unreacted primary $C_1$-$C_6$-alkanol, unreacted formaldehyde and water to obtain a concentrated composition of the etherified melamine formaldehyde resin;

iii. diluting the concentrated composition of the etherified melamine formaldehyde resin by addition of at least one solvent, the solvent being selected from the group consisting of water, primary $C_1$-$C_6$-alkanols, and solvents B, and mixtures thereof, where solvents B are selected from the group consisting of $C_1$-$C_2$-alkoxy-$C_2$-$C_4$-alkanols, secondary $C_3$-$C_6$-alkanols, tertiary $C_4$-$C_6$-alkanols, aliphatic monoketones having 3 to 8 carbon atoms, cyclic monoketones having 5 to 8 carbon atoms, $C_1$-$C_6$alkyl esters of $C_1$-$C_4$-alkanoic acids, $C_1$-$C_2$-alkoxy-$C_2$-$C_4$-alkyl esters of $C_1$-$C_4$-alkanoic acids and aromatic hydrocarbons;

wherein at least one of the following measures a) and/or b) is taken:

a) addition of water or a mixture of water and a solvent, which is selected from a primary $C_1$-$C_6$-alkanol and a water miscible solvent B and mixtures thereof, to the concentrated composition of the etherified melamine formaldehyde resin obtained in step ii. and removing at least the major portion of the added water by evaporation under reduced pressure;

b) the solvent used for dilution of the concentrated composition of the etherified melamine formaldehyde resin in step iii. comprises at least 50% by weight, based on the total weight of solvent used for dilution, of at least one organic solvent B.

By the process of the invention, the concentration of free formaldehyde in the liquid compositions of etherified melamine formaldehyde resins can be significantly reduced.

There is a particular advantage for liquid compositions of etherified melamine formaldehyde resin types 2a and 2b, where the concentration of free formaldehyde could not be reduced to values below 0.3% so far. Therefore, the present invention also relates to liquid compositions of an etherified melamine formaldehyde resin composition having a degree of methylolation from 2.4 to 5.4 and a degree of etherification from 30 to 100%, where the content of free formaldehyde is less than 0.3% by weight, in particular less then 0.2% by weight and especially at most 0.1% by weight or even lower than 0.1% by weight.

The invention also relates to the use of these liquid compositions as crosslinkers in coating compositions containing at least one binder polymer, which is crosslinkable.

Here and in the following, the term "free formaldehyde" relates to formaldehyde, which is not incorporated into the etherified melamine formaldehyde resins. Free formaldehyde can be determined by EN ISO 9020:1996 by titration with iodine.

Here and in the following, the term "degree of methylolation" means the relative molar amount of formaldehyde chemically bound in the etherified melamine formaldehyde resin.

Here and in the following, the terms "degree of etherification" and "degree of alkylation" mean the relative molar amount of $C_1$-$C_6$-alkanol chemically bound in the etherified melamine formaldehyde resin based on the molar amount of formaldehyde chemically bound in the etherified melamine formaldehyde resin.

Here and in the following, the prefix $C_1$-$C_n$ indicates the possible number of carbon atoms a compound or radical may have.

Hence, "$C_1$-$C_6$-alkyl" refers to the group of linear or branched, saturated hydrocarbon radicals having 1 to 6, in particular 1 to 4 carbon atoms, such as methyl, ethyl, n-propyl, 2-propyl, 1-butyl, 2-butyl, 1-methylpropyl, 2-methylpropyl, 1-methyl-2-propyl (=tert.butyl), 1-pentyl, 2-pentyl, 3-pentyl, 1-methylbutyl, 2-methylbutyl, 3-methylbutyl, 1-hexyl, etc.

The term "$C_1$-$C_2$-alkoxy-$C_2$-$C_4$-alkyl" refers to an alkyl radical having 2 to 4 carbon atoms, which is substituted by single methoxy or ethoxy group, examples including 2-methoxyethyl, 2-ethoxyethyl, 2-methoxypropyl, 2-ethoxypropyl, 3-methoxypropyl, 3-ethoxypropyl, 4-methoxybutyl, 4-ethoxybutyl, etc.

The term "primary $C_1$-$C_6$-alkanol" refers to the group of primary aliphatic alcohols having 1 to 6, in particular 1 to 4 carbon atoms, such as methanol, ethanol, n-propanol, n-butanol, 2-methyl-1-propanol, 1-pentanol, 2-methyl-1-butanol, 2,2-dimethyl-1-propanol, 3-methyl-1-butanol, 1-hexanol, 2-methyl-1-pentalol, 3-methyl-1-pentanol, 4-methyl-1-pentanol, 2,3-dimethylbutan-1-ol, 3,3-dimehtylbutan-1-ol and 2-ethylbutanol.

The term "$C_1$-$C_4$-alkanoic acid" refers to the group of saturated aliphatic carboxylic acids having 1 to 4 carbon atoms, such as formic acid, acetic acid, propionic acid, butyric acid and isobutyric acid.

According to step i) of the process of the invention, melamine, formaldehyde and a primary $C_1$-$C_6$-alkanol are reacted in order to obtain a mixture of the etherified melamine formaldehyde resin, water, unreacted formaldehyde and unreacted primary $C_1$-$C_6$-alkanol. The reaction can be performed by analogy to the methods of prior art cited above.

According to the invention, the reaction of step i) is performed at least temporarily, i.e. at least for a certain period of time, under acidic conditions in the presence of an excess of the primary $C_1$-$C_6$-alkanol. In this context, the term "excess of the primary $C_1$-$C_6$-alkanol" indicates that the molar amount of primary $C_1$-$C_6$-alkanol exceeds the molar amount of formaldehyde, which is theoretically required to achieve the desired degree of methylolation. For practical reasons, the molar amount of primary $C_1$-$C_6$-alkanol employed in step i) will usually exceed the molar amount of formaldehyde employed in step i).

Frequently, the alkanol is a linear primary $C_1$-$C_6$-alkanol, in particular a linear primary $C_1$-$C_4$-alkanol, which is especially selected from the group consisting of methanol and n-butanol.

The amount of formaldehyde used in step i) is usually in the range from 2.5 to 12 mol, in particular 3.0 to 10 mol per 1 mol of melamine. If a highly methylolated and highly alkylated melamine formaldehyde resins (type 1 resins) shall be prepared, the amount formaldehyde used in step i) is usually in the range from 5.8 to 12 mol, in particular 6.0 to 10 mol per 1 mol of melamine. If a partially methylolated and partially or highly alkylated melamine formaldehyde resins (types 2a and 2b resins) shall be prepared, the amount formaldehyde used in step i) is usually in the range from 2.5 to 10 mol, in particular 3.0 to 8.0 mol, especially 3.5 to 7.0 mol per 1 mol of melamine. The amount of $C_1$-$C_6$-alkanol used in step i) is usually in the range from 5.0 to 50 mol, in particular 10 to 35 mol per 1 mol of melamine. Generally, the molar amount of $C_1$-$C_6$-alkanol will exceed the molar amount of formaldehyde. If type 1 resins shall be prepared, the amount of $C_1$-$C_6$-alkanol used in step i) will usually be at least 20 mol, in particular 28 mol per 1 mol of melamine. If type 2a or type 2b resins shall be prepared, the amount of $C_1$-$C_6$-alkanol used in step i) will usually not exceed 40 mol, in particular 35 mol per 1 mol of melamine.

Step i) is at least temporarily performed under acidic conditions. The term "acidic conditions" means that the pH of the reaction mixture is significantly lower than pH 7, e.g. at most pH 6.5, in particular at most pH 6, especially at most pH 5.5, as determined by pH paper at 25° C. In particular, the term "acidic conditions" means a pH of the reaction mixture in the range from pH 2.0 to pH 6.0, especially in the range from pH 2.5 to pH 5.5.

In this context, the term "at least temporarily" means that the acidic conditions are not necessarily maintained during the complete reaction period. Rather it may be possible to maintain the acidic conditions only for a certain period of time of the reaction period. For example, it is possible to perform the reaction under neutral or alkaline conditions for a first period of time and then acidify the reaction mixture and to continue the reaction under acidic conditions.

Neutral conditions are conditions, where the pH of the reaction mixture is close to pH 7, e.g. between pH 6.5 and pH 7.5.

Alkaline conditions are conditions, where the pH of the reaction mixture is significantly above pH 7, e.g. at least pH 7.5, in particular at least pH 8, as determined by pH paper at 25° C. In particular, the term "alkaline conditions" means a pH of the reaction mixture in the range from pH 7.5 to pH 10.0, especially in the range from pH 8.0 to pH 9.5.

For example, formaldehyde and melamine may be reacted under neutral or alkaline conditions during a first period of time and then, during a second period of time, the $C_1$-$C_6$-alkanol is added, the pH is adjusted to acidic conditions and the reaction is continued under acidic conditions. It is also possible to react the $C_1$-$C_6$-alkanol, formaldehyde and melamine under neutral or alkaline conditions during a first period of time and then adjust the pH to acidic conditions and continue the reaction under acidic conditions. It is also possible to perform the reaction of the $C_1$-$C_6$-alkanol, formaldehyde and melamine completely under acidic conditions.

A skilled person will readily understand that acidic conditions are achieved by the addition of an acid. Suitable acids include carboxylic acids, such as formic acid, acetic acid, trifluoroacetic acid, sulfonic acids, such as methanesulfonic acid and toluene sulfonic acid, and mineral acids, such as hydrochloric acid, sulfuric acid and nitric acid.

A skilled person will also readily understand that alkaline conditions are achieved by the addition of base, in particular an inorganic base. Suitable bases include inorganic bases, such as alkalimetal carbonates and alkalimetal hydroxides, especially sodium hydroxide or potassium hydroxide and alkalimetal alkanolates, such as sodium methanolate or potassium methanolate.

If step i) includes a period of neutral conditions, the reaction mixture usually contains a tertiary amine base, in particular a tris(hydroxy-$C_2$-$C_4$-alkyl)amine, such as triethanol amine.

In step i), formaldehyde is frequently employed as an aqueous solution, but it is also possible to use oligomeric or polymeric formaldehyde, such as paraformaldehyde or trioxane. Frequently, aqueous solutions of formaldehyde are used, where the concentration of formaldehyde is in the range form 20 to 85% by weight, in particular 30 to 60% by weight. It may also be possible to use a distillate obtained in step ii) which usually contains formaldehyde, water and primary $C_1$-$C_6$-alkanol.

The reaction of step i) is usually conducted at elevated temperatures, e.g. at temperatures in the range from 40 to 120° C., in particular in the range from 50 to 110° C. During the reaction of step i), the temperature may vary.

The reaction of step i) may be conducted at ambient pressure or reduced pressure. Frequently, step i) is conducted at a pressure in the range from 40 mbar to 1100 mbar. However, lower and higher pressures may also be possible. During the reaction of step i), the pressure may vary. For example, one may perform the reaction of step i) completely under ambient pressure, e.g. in the range from 950 to 1050 mbar. However, is also possible to conduct the reaction for a first period of time under reduced pressure and then increase the pressure to ambient pressure for a second period of time. For example, if melamine and aqueous formaldehyde are reacted during the first period, it might be suitable to conduct this reaction under reduced pressure and to remove the water and then adjust the pressure to ambient pressure and continue the reaction by adding the alkanol and adjusting the pH to acidic conditions.

According to a particular group 1 of embodiments, step i) is performed by reacting a mixture of melamine, formaldehyde and the excess of primary $C_1$-$C_6$-alkanol under acidic conditions, until the desired degree of conversion is achieved.

According to another particular group 2 of embodiments, step i) is performed by reacting a mixture of melamine, formaldehyde and the excess of primary $C_1$-$C_6$-alkanol for a first period of time under alkaline or neutral conditions and thereafter under acidic conditions, until the desired degree of conversion is achieved.

According to a further particular group 3 of embodiments, step i) is performed by reacting a mixture of melamine and formaldehyde under neutral or alkaline conditions, optionally under reduced pressure to remove water, adding the primary $C_1$-$C_6$-alkanol and continuing the reaction under acidic conditions, until the desired degree of conversion is achieved.

The desired conversion may be determined e.g. by compatibility of the reaction mixture with petroleum ether or mineral spirit or when the initially turbid reaction mixture becomes clear. For example, during the reaction of step i), the polarity of the reaction mixture decreases with increasing conversion and hence, the compatibility with non-polar mineral spirit increases.

According to a further particular group 4 of embodiments, step i) is performed as follows:
i.1) reacting a mixture of melamine, formaldehyde and a primary $C_1$-$C_6$-alkanol under acidic conditions to obtain a first reaction mixture;
i.2) distilling off at least the major portion of volatiles contained in the first reaction mixture to obtain a concentrated reaction mixture; and
i.3) adding primary $C_1$-$C_6$-alkanol to the concentrated reaction mixture and reacting the thus obtained mixture under acidic conditions to obtain a mixture of the etherified melamine formaldehyde resin, water and primary $C_1$-$C_6$-alkanol.

According to a further particular group 5 of embodiments, step i) is performed as follows:
i.1)' reacting a mixture of melamine, formaldehyde and the excess of primary $C_1$-$C_6$-alkanol for a first period of time under alkaline or neutral conditions and thereafter under acidic conditions to obtain a first reaction mixture;
i.2)' distilling off at least the major portion of volatiles contained in the first reaction mixture to obtain a concentrated reaction mixture; and
i.3)' adding primary $C_1$-$C_6$-alkanol to the concentrated reaction mixture and reacting the thus obtained mixture under acidic conditions to obtain a mixture of the etherified melamine formaldehyde resin, water and primary $C_1$-$C_6$-alkanol.

According to a further particular group 6 of embodiments, step i) is performed as follows:
i.1)" reacting a mixture of melamine and formaldehyde under neutral or alkaline conditions, optionally under reduced pressure to remove water, adding the primary $C_1$-$C_6$-alkanol and continuing the reaction under acidic conditions, until the desired degree of conversion is achieved;
i.2)" distilling off at least the major portion of volatiles contained in the first reaction mixture to obtain a concentrated reaction mixture; and
i.3)" adding primary $C_1$-$C_6$-alkanol to the concentrated reaction mixture and reacting the thus obtained mixture under acidic conditions to obtain a mixture of the etherified melamine formaldehyde resin, water and primary $C_1$-$C_6$-alkanol.

In groups 4 to 6 of embodiments, the term "major portion" in steps i.2), i.2)' and i.2)", respectively, is understood that at least 50%, in particular at least 7% of the volatiles, i.e. formaldehyde, water and C1-C6-alkanol, contained in the reaction mixture of step i.1), i.1)', or i.1)", respectively, have been removed. The total amount of volatiles contained in the reaction mixture is the difference between the weight of the reaction mixture and the amount of non-volatile components, which can be determined as described below for the non-volatile fraction (NVF). The relative amount of volatiles in the reaction mixture, expressed in % by weight of the reaction mixture is the difference between 100% and the non-volatile fraction (NVF), expressed in % by weight of the reaction mixture, i.e. volatiles [%]=100%−NVF [%]. For example, if 70% of the volatiles contained in a reaction mixture having an NVF of 60% are removed, the amount of volatiles removed is 28% by weight of the reaction mixture. Frequently, the volatiles are removed in such an amount that the resulting non-volatile fraction obtained in steps i.2), i.2)', or i.2)", respectively, is at least 80% by weight, in particular in the range from 80 to 99% by weight.

In groups 4 to 6 of embodiments, the distillation in steps i.2), i.2)' and i.2)", respectively, may be performed at ambient pressure or under reduced pressure. Frequently, the pressure is reduced continuously or stepwise during the distillation. In particular, the distillation is performed in a pressure range from 50 mbar to ambient pressure.

In groups 4 to 6 of embodiments, the distillation in steps i.2), i.2)' and i.2)", respectively, is frequently performed under neutral or alkaline conditions, in particular at a pH in the range from pH 7.5 to pH 11, especially in the range from pH 8.0 to pH 10.5.

In groups 4 to 6 of embodiments, the distillation in steps i.2), i.2)' and i.2)", the distillation may be performed in a conventional distillation apparatus, but it may be beneficial to transfer the reaction mixture to a film evaporator, including thin-film evaporators, such as Sambay evaporators, and falling-film evaporators.

In groups 4 to 6 of embodiments, the primary $C_1$-$C_6$-alkanol added in steps i.3), i.3)' and i.3)", respectively, may be the same primary $C_1$-$C_6$-alkanol employed in steps i.1), i.1)', and i.1)", respectively, or another primary $C_1$-$C_6$-alkanol. For example, if methanol is used in steps i.1), i.1)', and i.1)", respectively, methanol may be used in steps i.3), i.3)' and i.3)", respectively, but it is also possible to use a primary $C_2$-$C_6$-alkanol in steps i.3), i.3)' and i.3)", respectively, such as ethanol or n-butanol.

The total reaction time required for step i) will frequently be in the range from 10 to 240 min, in particular in the range from 20 to 180 min, depending on the reaction conditions and whether the reaction includes a distillation or not. In groups 1 to 3 of embodiments, the reaction times will be shorter, e.g. from 10 to 90 min, while the total reaction time in groups 4 to 6 of embodiments, will be longer e.g. from 40 to 180 min.

The reaction of step i) may be conducted batch wise or continuously. Suitable reactors for batch wise operation include stirred tank reactors, which are optionally equipped with distillation devices. Suitable reactors for continuous operation include continuously operated stirred tank reactors, cascades of continuously operated stirred tank reactors, kneaders and reaction tubes, depending on the viscosity of the products and intermediate reaction mixtures. Suitable reactors for continuous operation are described e.g. in WO 2005/068441, EP 1607391 and U.S. Pat. No. 4,293,692.

In step ii) at least a major portion of the volatiles, i.e. unreacted primary $C_1$-$C_6$-alkanol, unreacted formaldehyde and water contained in the reaction mixture are distilled off to obtain a concentrated composition of the etherified melamine formaldehyde resin. Frequently at least 50%, in particular at least 70%, e.g. from 50 to 99%, in particular from 70 to 98% of the volatiles contained in the reaction mixture of step i), are removed by distillation in step ii).

Preferably, the volatiles are distilled off until the solid content of the concentrated composition is at least 80% by weight, e.g. in the range from 80 to 99% by weight. The solid content, as referred herein, is the non-volatile fraction (NVF), as determined in accordance with DIN EN ISO 3251:2003-07 by heating a probe of the resin composition together with an appropriate amount of n-butanol for two hours at 125° C. and ambient pressure.

Frequently, the distillation is stopped, when the viscosity of the concentrated composition exceeds a value or is in a range which is characteristic for the desired product. Such a value may be in the range from 2000 to 20000 mPas, in particular 2500 to 15000 mPas, especially 3000 to 12000 mPas, determined in accordance with ISO 3219/B:1993 at 23° C. using a cone/plate viscometer at a shear rate of 41 $s^{-1}$.

The distillation of step ii) may be performed at ambient pressure or under reduced pressure. Frequently, the pressure is reduced continuously or stepwise during the distillation of step ii). In particular, the distillation of step ii) is performed in a pressure range from 50 mbar to ambient pressure.

The distillation of step ii) is frequently performed under alkaline conditions, in particular at a pH in the range from pH 7.5 to pH 11, especially in the range from pH 8.0 to pH 10.5, in particular if step i) is performed according to groups 2 to 5 of embodiments or if the primary $C_1$-$C_6$-alkanol is selected from methanol or ethanol.

The distillation of step ii) may also be performed under acidic conditions, in particular at a pH in the range from pH 3.5 to pH 6.5, especially in the range from pH 4.0 to pH 6.0, in particular, if the primary $C_1$-$C_6$-alkanol is selected from primary $C_3$-$C_6$-alkanols, such as n-propanol or n-butanol.

The distillation of step ii) may be performed in suitable distillation equipment including conventional distillation apparatus, but it may be beneficial to transfer the reaction mixture to a film evaporator, including thin-film evaporators, such as Sambay evaporators, and falling-film evaporators.

In step iii) the concentrated composition of the etherified melamine formaldehyde resin, which is obtained in step ii) is diluted by addition of at least one solvent. The solvent for dilution is selected from water, primary $C_1$-$C_6$-alkanols, and solvents B as well as mixtures thereof, e.g. a mixture of water and a primary $C_1$-$C_6$-alkanol, mixtures of water and a solvent B, mixtures of primary $C_1$-$C_6$-alkanol and a solvent B and mixtures of solvents B, provided that either at least measure a) is taken, or, if measure a) is not taken, the solvent used for dilution comprises at least 50% by weight, in particular at least 65%, especially at least 90% by weight, based on the total weight of solvent used for dilution, of at least one organic solvent B.

Suitable solvents B are selected from the group consisting of $C_1$-$C_2$-alkoxy-$C_2$-$C_4$-alkanols, such as 2-methoxyethanol, 2-methoxypropanol and 3-methoxypropanol and 3-methoxybutanol;

secondary $C_3$-$C_6$-alkanols, such as isopropanol, 2-butanol, 2-pentanol and 3-pentanol;

tertiary $C_4$-$C_6$-alkanols, such as 2-methyl-2-propanol (tert-.butanol) and 2-methyl-2-butanol;

aliphatic monoketones having 3 to 8 carbon atoms, such as acetone, butanone, 2-pentanone, 3-pentanone, 3-methylbutan-2-one, 2-hexanone and 4-methylpentan-2-on;

cyclic monoketones having 5 to 8 carbon atoms, such as cyclopentanone, cyclohexanone and cycloheptanone;

$C_1$-$C_6$-alkyl esters of $C_1$-$C_4$-alkanoic acids, in particular $C_1$-$C_6$-alkyl esters of acetic acid, such as ethyl acetate, propyl acetate, n-butyl acetate and 2-butyl acetate, but also ethyl propionate, methyl butyrate, and ethyl butyrate;

$C_1$-$C_2$-alkoxy-$C_2$-$C_4$-alkyl esters of $C_1$-$C_4$-alkanoic acids, in particular $C_1$-$C_2$-alkoxy-$C_2$-$C_4$-alkyl esters of acetic acid, such as 2-methoxyethyl acetate, 2-methoxypropyl acetate and 3-methoxybutyl acetate; and aromatic hydrocarbons, in particular aromatic hydrocarbons having 6 to 10 carbon atoms, in particular methyl substituted benzenes, i.e. benzene compounds, where the benzene ring is substituted by 1, 2 or 3 methyl groups, such as toluene and xylenes.

Preferred solvents B are selected from the group consisting of aliphatic monoketones having 3 to 8 carbon atoms, cyclic monoketones having 5 to 8 carbon atoms, $C_1$-$C_6$-alkyl esters of $C_1$-$C_4$-alkanoic acids, methyl substituted benzenes and $C_1$-$C_2$-alkoxy-$C_2$-$C_4$-alkyl esters of $C_1$-$C_4$-alkanoic acids.

In particular, solvents B are selected from the group consisting of aliphatic monoketones having 4 to 8 carbon atoms, $C_2$-$C_6$-alkyl esters of $C_1$-$C_4$-alkanoic acids, methyl substituted benzenes and $C_1$-$C_2$-alkoxy-$C_2$-$C_4$-alkyl esters of $C_1$-$C_4$-alkanoic acids.

More particularly, solvents B are selected from the group consisting of $C_2$-$C_6$-alkyl esters of acetic acid, methyl substituted benzene and $C_1$-$C_2$-alkoxy-$C_2$-$C_4$-alkyl esters of acetic acid.

Even more particularly, the solvent B is selected from the group consisting of 2-butanone, 2-pentanone, 2-hexanone, cyclohexanone, 3-methyl-2-butanone, 4-methyl-2-pentanone, n-butyl acetate, xylene, 2-methoxyethyl acetate and 2-methoxypropyl acetate, especially from the group consisting of n-butyl acetate, xylene, 2-methoxyethyl acetate and 2-methoxypropyl acetate. Most preferred solvent B is n-butyl acetate.

If both measures a) and b) are taken, the type of solvent B is less critical and in addition to the aforementioned preferred solvents the protic solvents B may be used for dilution, i.e.

$C_1$-$C_2$-alkoxy-$C_2$-$C_4$-alkanols, such as 2-methoxyethanol, 2-methoxypropanol and 3-methoxypropanol and 3-methoxybutanol;

secondary $C_3$-$C_6$-alkanols, such as isopropanol, 2-butanol, 2-pentanol and 3-pentanol; and tertiary $C_4$-$C_6$-alkanols, such as 2-methyl-2-propanol (tert.butanol) and 2-methyl-2-butanol.

If both measures a) and b) are taken, preferred solvents B are therefore selected from the group consisting of $C_1$-$C_2$-alkoxy-$C_2$-$C_4$-alkanols, secondary $C_3$-$C_6$-alkanols, tertiary $C_4$-$C_6$-alkanols, aliphatic monoketones having 3 to 8 carbon atoms, cyclic monoketones having 5 to 8 carbon atoms, $C_1$-$C_6$-alkyl esters of $C_1$-$C_4$-alkanoic acids, methyl substituted benzenes and $C_1$-$C_2$-alkoxy-$C_2$-$C_4$-alkyl esters of $C_1$-$C_4$-alkanoic acids.

If both measures a) and b) are taken, solvents B are in particular selected from the group consisting of secondary $C_3$-$C_6$-alkanols, aliphatic monoketones having 4 to 8 carbon atoms, $C_2$-$C_6$-alkyl esters of $C_1$-$C_4$-alkanoic acids, methyl substituted benzenes and $C_1$-$C_2$-alkoxy-$C_2$-$C_4$-alkyl esters of $C_1$-$C_4$-alkanoic acids.

If both measures a) and b) are taken, solvents B are more particularly selected from the group consisting of secondary $C_3$-$C_6$-alkanols, $C_2$-$C_6$-alkyl esters of acetic acid, methyl substituted benzene and $C_1$-$C_2$-alkoxy-$C_2$-$C_4$-alkyl esters of acetic acid.

If both measures a) and b) are taken, solvents B are even more particularly selected from the group consisting of isopropanol, isobutanol, 2-butanone, 2-pentanone, 2-hexanone, cyclohexanone, 3-methyl-2-butanone, 4-methyl-2-pentanone, n-butyl acetate, xylene, 2-methoxyethyl acetate and 2-methoxypropyl acetate, especially from the group consisting of isopropanol, n-butyl acetate, xylene, 2-methoxyethyl acetate and 2-methoxypropyl acetate. In this case, most preferred solvent B is n-butyl acetate.

As stated above, the concentrated composition of the etherified melamine formaldehyde resin, which is obtained in step ii) is diluted in step iii) in order to adjust the viscosity of the liquid composition. Usually, the viscosity of the diluted composition will not exceed 15000 mPas, in particular 10000 mPas, especially 9500 mPas and is frequently adjusted to be in the range from 300 to 15000 mPas, in particular form 500 to 10000 mPas, especially 500 to 9500 mPas, as determined in accordance with ISO 3219/B:1993 at 23° C. using a cone/plate viscometer at a shear rate of 41 s$^{-1}$.

The dilution of step iii) may be performed at ambient temperature, but it is frequently performed at a temperature of at least 40° C., in particular at least 50° C. or at least 60° C. The temperature of dilution will frequently not exceed 120° C. and is in particular in the range from 40 to 120° C., more particularly in the range from 50 to 100° C. and especially in the range from 60 to 95° C.

Frequently, the dilution is performed such that the solid content of the resulting liquid composition of the etherified melamine formaldehyde resin is in the range from 50 to 98% by weight, in particular in the range from 60 to 96% by weight.

As stated above, either measure a) or measure b) or both are taken to achieve a low formaldehyde content in the resulting liquid composition of the etherified melamine formaldehyde resin. Preferably, measure a) is taken, in particular both measures a) and b) are taken. Especially, measure a) is performed first and then measure b) is taken. However, it is also possible to solely perform measure b), in particular, if a type 2b resin shall be prepared and/or if the primary $C_1$-$C_6$-alkanol used for etherification is selected from primary $C_3$-$C_6$-alkanols, such as n-propanol or n-butanol. In this case, it is of course also possible to combine steps a) and b).

If measure a) is taken, water, or a mixture of water and a $C_1$-$C_6$-alkanol or a mixture of water and a water-miscible solvent B or a mixture of water, a $C_1$-$C_6$-alkanol and a water-miscible solvent B may be added. Suitable water-miscible solvents B are those, which have miscibility with water of at least 50 g/L at 25° C. Such solvents B include acetone, 2-butanone cyclohexanone, 2-methoxyethylacetate and 1-methoxy-2-propyl acetate. If a mixture of water and an organic solvent is used in measure a), the amount of water is preferably at least 50% by weight, based on the total weight of the added mixture. Preferably, water or a mixture of water and a $C_1$-$C_4$-alkanol are used in measure a). Especially, solely water or a mixture of water with the organic solvent, wherein the amount of water makes up at least at least 80% by weight of the mixture, is used in measure a).

If measure a) is taken, the added water may be demineralized water or deionized water but also tap water. In particular, the added water does not contain noticeable amounts of acid or bases, i.e. the amount of acid or base contained in the added water is less than 0.1 mol/l.

If measure a) is taken, the amount of water, which is added to the concentrated composition of the etherified melamine formaldehyde resin, is from 0.5 to 15% by weight, in particular from 1 to 12% by weight, based on the weight of the concentrated composition of the etherified melamine formaldehyde resin.

Measure a) may be performed e.g. by adding liquid water or a liquid mixture of water and organic solvent to the concentrated composition of the etherified melamine formaldehyde resin and then starting evaporating of the water under reduced pressure, until the major portion of the added water has been removed. Preferably, water or the mixture of water with the organic solvent is added under reduced pressure, either as a liquid or as steam.

Measure a) is especially performed by adding water in the form of liquid water or steam to the concentrated composition of the etherified melamine formaldehyde resin, in particular under reduced pressure, and concomitantly evaporating the water under reduced pressure, until the major portion of the added water has been removed.

In measure a) frequently the evaporation is performed until at least 80%, especially at least 90% or the total amount of the water, which has been added to the concentrated composition of the etherified melamine formaldehyde resin has been evaporated.

According to the invention, the evaporation in measure a) is performed under reduced pressure. Frequently, the pressure will not exceed 400 mbar, in particular 200 mbar, and is frequently in the range from 1 to 400 mbar and in particular in the range from 10 to 200 mbar. Preferably, the evaporation is performed at temperatures in the range from 40 to 110° C., in particular 50 to 100° C.

Especially, measure a) is performed by adding water in the form of liquid water or steam to the concentrated composition of the etherified melamine formaldehyde resin at a temperature in the range from 60 to 110° C., in particular 75 to 100° C. under reduced pressure, and concomitantly evaporating the water under reduced pressure, until the major portion of the added water has been removed.

The pH of the concentrated composition of the etherified melamine formaldehyde resin on which measure a) is taken is frequently in the range from pH 7.5 to pH 11, especially in the range from pH 8.0 to pH 10.

Evaporation may be performed in a conventional distillation apparatus or in a film evaporator. For example, the pressure in a distillation apparatus containing the concentrated composition of the etherified melamine formaldehyde resin is set to a reduced pressure in the above range and then liquid water or the liquid mixture of water and solvent is added in one portion or several portions or continuously and evaporation of the water starts. It is also possible to add liquid water or the liquid mixture of water and solvent to the concentrated composition of the etherified melamine formaldehyde resin and then reduce the pressure and starting evaporation in a distillation apparatus or in a falling film or thin film evaporator. It is also possible to transfer the concentrated composition of the etherified melamine formaldehyde resin to a falling film or thin film evaporator, which is set to reduce pressure and adding water by injecting steam into the evaporator.

Measure a) may be performed once or repeatedly. If measure a) is performed repeatedly, the total amount of water used in repeated measures a) will frequently not exceed 15% by weight of the total amount of the concentrated composition of the etherified melamine formaldehyde resin on which measure a) is performed. According to measure b), the dilution of step iii) is performed by using a solvent which contains at least 50% by weight, in particular at least 65% by weight, especially at least 90% by weight, based on the total amount of solvent used for dilution, of one or more solvents B. If a mixture of a solvent B and a solvent, which is different from solvent B, is used for dilution, the solvents should be compatible, i.e. they should be miscible in the desired proportions. For example, a mixture of water and a solvent B may in some cases not be compatible, while mixtures of $C_1$-$C_6$-alkanols with solvents B will be compatible.

Preferably, the solvent which is used according to measure b) contains at least 50% by weight, in particular at least 65% by weight, especially at least 90% by weight, based on the total amount of solvent used for dilution, of one or more solvents B, which are selected from the group consisting of aliphatic monoketones having 3 to 8 carbon atoms, cyclic monoketones having 5 to 8 carbon atoms, methyl substituted benzenes, $C_1$-$C_6$-alkyl esters of $C_1$-$C_4$-alkanoic acids and $C_1$-$C_2$-alkoxy-$C_2$-$C_4$-alkyl esters of $C_1$-$C_4$-alkanoic acids.

In particular, the solvent which is used according to measure b) contains at least 50% by weight, in particular at least 65% by weight, especially at least 90% by weight, based on the total amount of solvent used for dilution, of one or more solvents B, which are selected from the group consisting of aliphatic monoketones having 4 to 8 carbon atoms, saturated cyclic monoketones having 5 to 8 carbon atoms, methyl substituted benzenes, $C_2$-$C_6$-alkyl esters of $C_1$-$C_4$-alkanoic acids and $C_1$-$C_2$-alkoxy-$C_2$-$C_4$-alkyl esters of $C_1$-$C_4$-alkanoic acids.

More particularly, the solvent which is used according to measure b) contains at least 50% by weight, in particular at least 65% by weight, especially at least 90% by weight, based on the total amount of solvent used for dilution, of one or more solvents B, which are selected from the group consisting of aliphatic monoketones having 4 to 6 carbon atoms, saturated cyclic monoketones having 5 or 6 carbon atoms, $C_2$-$C_6$-alkyl esters of acetic acid, methyl substituted benzenes and $C_1$-$C_2$-alkoxy-$C_2$-$C_4$-alkyl esters of acetic acid.

Even more preferred, the solvent which is used according to measure b) contains at least 50% by weight in particular at least 65% by weight, especially at least 90% by weight, based on the total amount of solvent used for dilution, of one or more solvents B, which are selected from the group consisting of 2-butanone, 2-pentanone, 2-hexanone, cyclohexanone, 3-methyl-2-butanone, 4-methyl-2-pentanone, butyl acetate, xylene, 2-methoxyethyl acetate and 2-methoxypropyl acetate, in particular from the group consisting of n-butyl acetate, xylene, 2-methoxyethyl acetate and 2-methoxypropyl acetate.

Especially, the solvent which is used according to measure b) contains at least 50% by weight, in particular at least 65% by weight, especially at least 90% by weight, based on the total amount of solvent used for dilution, n-butyl acetate. Most preferred, the solvent which is used according to measure b) is n-butyl acetate.

As stated above, the present invention also relates to liquid compositions of etherified melamine formaldehyde resins of type 2a or 2b, i.e. resins which have a degree of methylolation from 2.4 to 5.4, in particular from 2.5 to 5 and especially from 3 to 4.5. The degree of etherification is frequently from 30 to 100%, especially from 50 to 95%, where the content of free formaldehyde of less than 0.3% by weight, in particular less than 0.2% by weight, and especially less than 0.1% by weight. The amount of bound $C_1$-$C_6$-alkanol is frequently in the range from 2 to 4.5 mol, in particular from 2 to 4.3 mol and especially from 2.5 to 4 mol per 1 mol of melamine.

It is apparent to a skilled person that the liquid composition of the invention will also contain the solvent which is used for dilution of the concentrated etherified melamine formaldehyde resin composition. Furthermore, such compositions may contain additives used for stabilization of such compositions, in particular acid, base or buffer to adjust the pH of the final product, which is preferably in the range of pH 6.0 to pH 8.5, in particular in the range from pH 6.5 to pH 8.0.

Preferably, the solid content, i.e. the non-volatile fraction, of the inventive liquid composition of the etherified melamine formaldehyde resin is in the range from 50 to 90% by weight, in particular in the range from 60 to 85% by weight.

Usually, the viscosity of the liquid composition of the etherified melamine formaldehyde resin of the invention will not exceed 15000 mPas, in particular 10000 mPas, and is frequently adjusted to be in the range from 1000 to 15000 mPas, in particular from 2000 to 10000 mPas, as determined in accordance with ISO 3219/B:1993 at 23° C. using a cone/plate viscometer at a shear rate of 41 $s^{-1}$.

Due to the low content of free formaldehyde, the liquid compositions of the invention and likewise the liquid compositions obtained by the process of the invention are particularly useful for any of the purposes, where etherified melamine formaldehyde resins are normally employed, including the use as crosslinking agents in coating compositions containing crosslinkable polymer or oligomer binders, in particular coating compositions for durable lacquers in the field of automotive, appliances, coil coating and can coating. The liquid compositions of the invention and likewise the liquid compositions obtained by the process of the invention can be used for the production of pressed mats, as a constituent of watertight adhesives for gluing veneer, in the production of laminates, edge bands, in surface shaping of sheet material and in the paper industry, e.g. for impregnating and coating of paper.

The liquid compositions of the invention, which contain an etherified melamine formaldehyde resin of types 2a or 2b are particularly useful as crosslinkers in coating compositions, containing at least one binder polymer, which is crosslinkable.

Suitable coating compositions, wherein the liquid etherified melamine formaldehyde resin of types 2a or 2b can be used, include industrial coatings, automotive coatings, paints, including paints for building exteriors and building interiors, which can be solvent borne or water borne.

The coating compositions contain one or more polymer or oligomer binders, e.g. film-forming polymers or prepolymers (oligomers) which form a film upon curing. The curing usually includes a reaction of the etherified melamine formaldehyde resin with reactive groups in the binder polymer or oligomer, whereby covalent bonds are formed and result in a crosslinking of the binder. Therefore, the crosslinkable binder will usually bear reactive groups, which are capable of reacting with the reactive sites of the etherified melamine formaldehyde resin, i.e. the imino groups, the methylol groups and the alkoxymethyl groups of the etherified melamine formaldehyde resin, the latter being methylol groups in latent form, as the alkoxy group may be cleaved under curing conditions. Suitable reactive groups include in particular hydroxyl groups, carboxy, amino, amido, carbamato, mercapto, and groups convertible thereto. Preference is given to binders which contain as reactive groups hydroxyl groups and/or carboxyl groups, with special preference given to binders having hydroxyl groups. Suitable hydroxyl-functional and/or carboxyl-function binders include alkyd resins, polyester resins, acrylic resins, acrylic-alkyd hydrids, acrylic-polyester hydrids, polyether polymers, hydroxylated and/or carboxylated polyolefines, polyurethanes, including polyether-polyurethanes, polyester-polyurethanes, polycarbonate-polyurethanes, and polyolefin-polyurethanes. In this context, the term acrylic relates to polymers made of acrylate and/or methacrylate monomers.

Depending on the type of coating composition, the binders may be used in the form of their solutions in organic solvents and also in the form of aqueous dispersions.

The preferred binders, which bear reactive groups, are hydroxyfunctional and/or carboxyfunctional (meth)acrylate polymers and hydroxyfunctional and/or carboxyfunctional polyester resins, with hydroxyfunctional polymeres being especially preferred. In this context, (meth)acrylate refers to both acrylate and methacrylate. Likewise, (meth)acrylic acid refers to both acrylic acid and methacrylic acid. Illustrative examples of polyfunctional materials include acrylic resins which may be obtained by the copolymerization of $C_1$-$C_{10}$-alkyl esters of (meth)acrylic acid, such as ethyl acrylate, n-butyl acrylate, tert.-butyl acrylate, 2-ethylhexyl acrylate, ethyl methacrylate, n-butyl methacrylate, tert.-butyl methacrylate, methyl methacrylate and the like, with hydroxyfunctional (meth)acrylic esters, e.g. hydroxyl-$C_2$-$C_4$-alkyl esters of acrylic acid or methacrylic acid, such as hydroxyethyl acrylate, hydroxypropyl acrylate, hydroxybutyl acrylate, hydroxyethyl methacrylate, hydroxypropyl methacrylate or hydroxybutylmethacrylate, optionally with one or more further vinyl compounds, such as, for example, styrene. Illustrative examples of polymers, which bear reactive groups, are also hydroxyfunctional polyester resins which may be obtained, for example, by the reaction of polycarboxylic acids with excess quantities of polyhydric alcohols. Suitable hydroxyfunctional resins also include epoxy or polyurethane prepolymers, alkyd resins, and the like. However, it will also be possible to use air drying binders, as the etherified melamine formaldehyde resin molecules may undergo crosslinking by themselves, thereby forming a reticulated network which improves the durability of the polymer film formed by the air drying binder.

Frequently, binders which have pendent or terminal hydroxyl groups, preferably have the following characteristics: weight average molecular weights (Mw) of from about 750 to about 50000, and more preferably from about 1000 to about 20000; and hydroxyl numbers of from about 20 to about 200 mg KOH/g resin. For waterborne coating applications, resins having higher molecular weights are generally preferred. Other suitable hydroxy functional resins will be readily recognized by those of ordinary skill in the art. Particularly preferred are such hydroxy-functional resins that have primary hydroxyl groups, where it is especially preferred that a fraction of at least 50% of all hydroxyl groups present in the polymer are primary.

The curable coating compositions of the present invention may further comprise a cure catalyst, examples of which again are in general well known to those of ordinary skill in the art. The cure catalysts usable in the present invention include, for example, sulfonic acids, aryl, alkyl, and aralkyl acid phosphates, aryl, alkyl, and aralkyl acid pyrophosphates, carboxylic acids, sulfonimides, mineral acids, Lewis acids, organometallic compounds and a mixture thereof. Of the above acids, sulfonic acids are preferred. Examples of the sulfonic acids include benzenesulfonic acid, para-toluenesulfonic acid, dodecylbenzenesulfonic acid, naphthalenesulfonic acid, dinonylnaphthalenedisulfonic acid, and a mixture thereof. Examples of the aryl, alkyl, and aralkyl phosphates and pyrophosphates include phenyl, para-tolyl, methyl, ethyl, benzyl, diphenyl, di-para-tolyl, dimethyl, di-ethyl, di-benzyl, phenyl-para-tolyl, methyl-ethyl, phenyl-benzyl phosphates and pyrophosphates. Examples of the carboxylic acids include benzoic acid, formic acid, acetic acid, propionic acid, butyric acid, dicarboxylic acids, such as oxalic acid, fluorinated acids, such as trifluoroacetic acid, and the like. Examples of the sulfonimides include dibenzene sulfonimide, di-para-toluene sulfonimide, methyl-para-toluene sulfonimide, dimethyl sulfonimide, and the like. Examples of the mineral acids include nitric acid, sulfuric acid, phosphoric acid, poly-phosphoric acid, and the like. Examples of the Lewis acids include boron and aluminum halides. Examples of the organometallic compounds include organotin compounds, such as dibutyltin di-2-ethylhexoate, dibutyltin diisooctyl maleate, dibenzyltin di-2-ethylhexanoate, dibutyltin dilaurate, dimethyltin dilaurate, tetrabutyl diacetoxy distannoxane, tetramethyl diacetoxy distannoxane, tetrapropyl diacetoxy distannoxane, dibutyltin dichloride, and the like.

Depending on the type of binder, the coating compositions may contain an aqueous or non-aqueous diluent. The diluent present in the coating composition will depend on the field of application in a known manner. Suitable aqueous diluents include water and mixtures of water with organic solvents that are miscible with water, including $C_1$-$C_4$ alkanols, e.g. methanol, ethanol, isopropanol, propanol or n-butanol, aliphatic diols, such as ethylene glycol or propylene glycol, and triols, such as glycerine. Suitable non-aqueous diluents include organic solvents, such as $C_1$-$C_6$ alkanols, ketones, such as di-$C_1$-$C_4$-alkyl ketones, such as acetone, methylethyl ketone, diethylketone, cyclic ketones, such as cyclohexanone, esters of aliphatic acids, in particular of acetic acid, such as ethyl acetate, butyl acetate, methoxyethyl acetate, methoxypropyl acetate, aromatic hydrocarbons, such as toluene, xylenes, and aromatic distillates, aromatic ethers, such as anisole, glycol ethers like butyl glycol, or methoxypropylene glycol.

In addition, the coating compositions may contain one or more pigment materials. The term "pigment materials", as used herein, includes both pigments and fillers, one or more pigments and mixtures of at least one pigment and at least one filler. Pigments include organic pigments, inorganic pigments and luster pigments/perlescent flakes.

Suitable inorganic pigments are e.g.

white pigments, such as titanium dioxide (C.I. Pigment White 6) including crystal forms or modifications thereof, such as rutil or anatas, zinc oxide, zinc sulphide, zinc phosphate, lithopone;

black pigments: iron oxide black (C.I. Pigment Black 11), iron-manganese black, spinel black (C.I. Pigment Black 27); carbon black (C.I. Pigment Black 7); graphite (C.I. Pigment Black 10); chromium-iron-black (P. Brown 29);

inorganic colored pigments: chrome oxide, chrome oxide hydrate green; chrome oxide green (C.I. Pigment Green 48); cobalt green (C.I. Pigment Green 50); ultramarine greene; cobalt blue (C.I. Pigment Blue 28 und 36; C.I. Pigment Blue 72); ultramarine blue; blue manganese; ultramarine violet; cobalt- and manganese violet; red iron oxide (C.I. Pigment Red 101); cadmium sulfoselenides (C.I. Pigment Red 108); cerium sulfide (C.I. Pigment Red 265); molybdenum red (C.I. Pigment Red 104); ultramarine red; brown iron oxide (C.I. Pigment Brown 6 und 7), mixed brown, spinel phases and corundum phases (C.I. Pigment Brown 29, 31, 33, 34, 35, 37, 39 und 40), chromium titanium yellow (CI Pigment Brown 24), chrome orange; cerium sulfide (C.I. Pigment Orange 75); yellow iron oxide (CI Pigment Yellow 42); nickel titanium yellow (C.I. Pigment Yellow 53; C.I. Pigment Yellow 157, 158, 159, 160, 161, 162, 163, 164 und 189); Chromium titanium yellow; Spinel phases (CI Pigment Yellow 119); Cadmium sulfide and cadmium zinc sulfide (CI Pigment Yellow 37 and 35); Chrome yellow (CI Pigment Yellow 34); Bismuth vanadate (CI Pigment Yellow 184).

Examples of suitable organic pigments include azo pigments, disazo pigments, naphthol pigments, benzimidazolone pigments, disazocondensation pigments, metal complex pigments, isoindolinone pigments, isoindoline pigments, the chinophthalon pigments, dioxazine pigments and the polycyclic pigment group consisting of indigo, thioindigo, quinacridones, phthalocyanines, perylenes, perionones, anthraquinones, such as aminoanthraquinones or hydroxyanthraquinones, anthrapyrimidines, indanthrones, flavanthrones, pyranthrones, anthantrones, isoviolanthrones, diketopyrrolopyrrole, and carbazoles, e.g. carbazole violet, and the like. Further examples of organic pigments can be found in the monograph: W Herbst, K Hunger "*Industrielle Organische Pigmente*" $2^{nd}$ *Edition*, 1995, *VCH Verlagsgesellschaft, ISBN:* 3-527-28744-2.

The luster pigments are single-phase or multi-phase construction lamellar pigments, whose color play is characterized by the interplay of interference, reflection and absorption phenomena. Examples are aluminum platelets and one or more times, especially of metal oxides coated aluminum, iron oxide and mica platelets.

Suitable fillers are calcium carbonate, such as natural and precipitated chalksilicon dioxides, such as quartz powder and transparent silicon dioxide, silicates, talc, kaolin, natural and synthetic mica, barium sulphate, metal oxides and hydroxides, such as aluminium oxide and aluminium hydroxide.

The coating composition may optionally contain conventional additives conventionally used in coating technology, e.g. plasticisers, lubricants, emulsifiers, rheology additives, catalysts, flow auxiliaries, optical brighteners, flame retardants, preservatives, antistatic agents or blowing agents.

EXAMPLES

The free formaldehyde content was determined in accordance with EN ISO 9020:1996 by reacting a defined probe of the composition with $Na_2SO_3$ and titration of excess sulfite with iodine.

The viscosity was determined in accordance with ISO 3219/B:1993 at 23° C. using a cone/plate viscometer at a shear rate of 41 $s^{-1}$.

The non-volatile fraction (NVF) was determined according to DIN EN ISO 3251:2003-07 by heating a 2 g probe of the resin composition covered with 2 ml of n-butanol in an aluminum pan for two hours at 125° C. and ambient pressure in a ventilated drying cabinet.

The compatibility with mineral spirit was determined at ambient conditions by mixing the resin composition to be tested with mineral spirit having a boiling range 155 to 185° C. and determining the amount of white spirit when the mixture becomes cloudy. For this, 5 ml of the resin composition to be tested was given in a graduated tube. To this, the mineral spirit was added in successive 1 ml portions. After each addition, the mixture was shaken vigorously and it was visually determined whether the mixture remained clear or whether the mixture has become cloudy or hazy. The compatibility is the minimum amount of mineral spirit in ml per 1 ml of the resin composition to be tested, which is required to observe haziness or cloudiness, respectively. For example, a compatibility of 6:1 means that per 1 ml of the resin composition to be tested a minimum of 6 ml of white spirit having a boiling range 155 to 185° C. is required to observe haziness or cloudiness. For the determination of the pH value of the reaction mixture pH paper type Pehanon of the company Fa. Macherey-Nagel was used (measurement accuracy +/−0.1 pH).

Comparative Example

A reactor was charged with 1104 g (14.9 mol) of n-butanol and 346 g of a 40 percent by weight aqueous formaldehyde solution (corresponding to 4.61 mol of formaldehyde) were metered in at 22° C. 0.14 mL of a 25% aqueous sodium hydroxide solution and subsequently 126 g (1.00 mol) of melamine were added. The resulting mixture was heated under reflux. When the reaction mixture became clear, 0.42 mL of a 30% nitric acid were metered in. Under ambient pressure, volatile components (n-butanol, water and formaldehyde) were distilled off until the compatibility of the residue with mineral spirit was 6:1. The temperature was reduced to 95° C., and 0.76 mL of 25% aqueous sodium hydroxide solution were metered in. Further volatile components were distilled off under a reduced pressure of 100 mbar and a maximum temperature of 80° C. until the residue had a viscosity of 6200 to 8000 mPas. The temperature was then reduced to 60° C. n-Butanol was added until the NVF was 72% by weight. The free formaldehyde content of the final product was 0.8% by weight.

Example 1

A reactor was charged with 310 g of a 40% by weight aqueous solution of formaldehyde (corresponding to 4.13 mol of formaldehyde). 948 g of n-butanol (12.8 mol) were added followed by the addition of 126 g of melamine (1.00 mol). The mixture was heated at 97° C., kept at that temperature for 10 minutes and subsequently the pH was adjusted to pH 5 using nitric acid. The reaction mixture was distilled at a maximum temperature of 105° C. over a period of 4 hours to remove the volatiles. Then, distillation was continued until a temperature of 130° C. was reached. The resulting concentrated composition was cooled to 100° C. and divided into two equal portions A and B.

Portion A was divided into two equal portions A1 and A2.

Portion A1 (comparative): n-butanol was added at 95° C. until a viscosity of 6000 mPas was achieved. The free formaldehyde content was 0.30% by weight.

Portion A2: n-butyl acetate was added at 95° C. until a viscosity of 6000 mPas was achieved. The concentration of free formaldehyde was 0.21% by weight.

Portion B was heated to 80° C. under reduced pressure of 100 mbar. Subsequently, 10 mL of water were slowly added while maintaining the reduced pressure. The temperature decreased. Subsequently, water was distilled off and the temperature thereby was raised to 80° C. This procedure was twice repeated. Then, portion B was divided into two equal portions B1 and B2.

Portion B1: n-butanol was added at 95° C. until a viscosity of 6000 mPas was achieved. The free formaldehyde content was 0.18% by weight.

Portion B2: n-butyl acetate was added at 95° C. until a viscosity of 6000 mPas was achieved. The free formaldehyde content was 0.07% by weight.

Example 2

A reactor was charged with 300 g of a 40% by weight aqueous solution of formaldehyde (corresponding to 4.00 mol of formaldehyde). Subsequently, a pH value of 8.3 was adjusted using 0.23 mL of 25% aqueous sodium hydroxide solution. Then, 126 g of melamine (1.00 mol) were metered in. The resulting mixture was heated to 90° C., the temperature was maintained for 5 minutes and then the temperature was reduced to 75° C. 522 g of methanol (16.3 mol) were added followed by the addition of 5.1 mL of 30% nitric acid to adjust a pH value of 4.9. The batch was kept at 50° C. for 45 minutes. Then, the pH value was adjusted to 8.1 using 3.6 mL of 25% aqueous sodium hydroxide solution. The reaction mixture was distilled under reduced pressure of 150 mbar at a maximum temperature of 70° C. The resulting concentrated composition was divided into two equal portions A and B.

Portion A (comparative): Water was added at 65° C. until a viscosity of 1000 mPas was achieved. The free formaldehyde content was 0.40% by weight.

Portion B was heated to 80° C. under a reduced pressure of 100 mbar. Subsequently, 10 mL of water were slowly added under reduced pressure. The temperature decreased. Subsequently, water was distilled off and the temperature thereby was raised to 80° C. This procedure was twice repeated. Water was added at 65° C. until a viscosity of 1000 mPas was achieved. The free formaldehyde content was 0.26% by weight.

Example 3

A reactor was charged with 675 g of a 40% by weight aqueous formaldehyde solution (corresponding to 9.00 mol of formaldehyde). Subsequently, a pH value of 9.1 was adjusted using 0.9 mL of 25% aqueous sodium hydroxide solution. Then, 126 g of melamine (1.00 mol) were metered in. The mixture was heated at 70° C., held at that temperature for 20 minutes and then 480 g of methanol (15.0 mol) were metered in. 5.0 mL of 30% nitric acid were metered in to adjust a pH value of 3.8. The batch was held at 50° C. and become clear. 10 minutes after reaching the clear point, the pH value was adjusted to 9.1 using 4.0 mL of 25% aqueous sodium hydroxide solution. The reaction mixture was distilled at a maximum temperature of 91° C. The temperature was slightly reduced, and the reaction mixture was distilled until the residue had a viscosity of 3500 mPas. The temperature was reduced to 65° C. Further 480 g of methanol (15.0 mol) were metered in. 5.0 mL of 30% nitric acid were metered in to adjust a pH value of 3.8. The batch was held at 60° C. for 30 minutes under stirring. Then, a pH value of 8.1 was adjusted using 3.6 mL of 25% aqueous sodium hydroxide solution. The reaction mixture was distilled at a maximum temperature of 90° C. Temperature was slightly reduced and then the reaction mixture was distilled under a reduced pressure of 100 mbar at 100° C. The batch was divided into two equal parts, part A and part B.

Part A was also divided into two equal parts, part A1 and part A2.

Part A1: isopropanol was added at 95° C. until a viscosity of 9000 mPas was achieved. The free formaldehyde content was 0.11% by weight.

Part A2: n-butyl acetate was added at 95° C. until a viscosity of 9000 mPas was achieved. The free formaldehyde content was 0.04% by weight.

Part B was heated at 100° C. under a reduced pressure of 100 mbar. Subsequently, 10 mL of water were slowly added under reduced pressure. The temperature fell. Subsequently, water was distilled off and the temperature thereby was raised to 100° C. This procedure was twice repeated. Then, part B was divided into two equal parts, part B1 and part B2.

Part B1: isopropanol was added at 95° C. until a viscosity of 9000 mPas was achieved. The free formaldehyde content was less than 0.03% by weight. Part B2: n-butyl acetate was added at 95° C. until a viscosity of 9000 mPas was achieved. The free formaldehyde content was less than 0.03% by weight.

Example 4

A reactor was charged with 390 g of a 40 percent by weight aqueous formaldehyde solution (corresponding to 5.20 mol of formaldehyde). Subsequently, the pH was adjusted to pH 6.9 using 0.3 mL of triethanolamine (purity >98%). Then, 126 g of melamine (1.00 mol) were metered in. The resulting mixture was kept at reduced pressure of 100 mbar and then heated to 60° C., the distillate being separated off. Then 384 g of methanol (12.0 mol) were added followed by the addition of 1.7 mL of 30% nitric acid to adjust the pH to pH 4.8. The resulting mixture was held at 50° C. for 60 min with stirring and became clear. The pH was adjusted to pH 8.5 using 1.8 mL of 25% aqueous sodium hydroxide solution. The reaction mixture was distilled at a maximum temperature of 90° C. The temperature was slightly reduced and distillation was continued at 70° C. under reduced pressure (100 mbar). The temperature was reduced to 65° C. Further 224 g of methanol (7.00 mol) were added followed by the addition of 2.6 mL of 30% nitric acid to adjust the pH value to pH 4.2. The resulting mixture was kept at 50° C. for 30 minutes with stirring. Then, a pH value of 8.5 was adjusted using 2.2 mL of 25% aqueous sodium hydroxide solution. The reaction mixture was distilled at a maximum temperature of 95° C. Temperature was slightly reduced and then distillation was continued under reduced pressure of 150 mbar at 100° C. The obtained concentrated composition was divided into two equal portions A and B.

Portion A was divided into three equal portions A0, A1 and portions A2.

Portion A0 (comparative): n-butanol was added at 95° C. until a viscosity of 4000 mPas was achieved. The free formaldehyde content was 0.75% by weight.

Portion A1: isobutanol was added at 95° C. until a viscosity of 4000 mPas was achieved. The free formaldehyde content was 0.60% by weight.

Portion A2: n-butyl acetate was added at 95° C. until a viscosity of 4000 mPas was achieved. The free formaldehyde content was 0.22% by weight.

Portion B was heated to 85° C. under a reduced pressure of 150 mbar. Subsequently, 10 mL of water were slowly added under reduced pressure. The temperature decreased. Subsequently, water was distilled off and the temperature thereby was raised to 85° C. This procedure was twice repeated. Then, portion B was divided into two equal portions B1 and B2.

Portion B1: isopropanol was added at 95° C. until a viscosity of 4000 mPas was achieved. The free formaldehyde content was 0.14% by weight.

Portion B2: n-butyl acetate was added at 95° C. until a viscosity of 4000 mPas was achieved. The free formaldehyde content was 0.10% by weight.

Example 5

A reactor was charged with 390 g of a 40 percent by weight aqueous formaldehyde solution (corresponding to 5.20 mol of formaldehyde). Subsequently, the pH was adjusted to pH 6.7 using 0.32 mL of triethanolamine (purity >98%). Then, 126 g of melamine (1.00 mol) were metered in. The resulting mixture was kept at reduced pressure of 150 mbar and then heated to 45° C., the distillate being separated off. Then the mixture was heated to 55° C. at reduced pressure and distillation was continued until no further distillate was observed. Then, 144 g of methanol (4.5 mol) and 614 g of n-butanol (8.3 mol) were added followed by the addition of 2.7 mL of 30% nitric acid to adjust the pH to pH 4.5. The resulting mixture was held at 70° C. for 60 min with stirring and became clear. The pH was adjusted to pH 8.1 using 3.0 mL of 25% aqueous sodium hydroxide solution. The reaction mixture was distilled at a maximum temperature of 115° C. The temperature was slightly reduced and distillation was continued at 90° C. under reduced pressure (150 mbar). Subsequently, 15 ml of water were slowly added under reduced pressure (150 mbar). Thereby the temperature decreased. Then the water was distilled off at 80° C. and 150° C. Thereafter, further 15 ml of water were slowly added under reduced pressure (150 mbar) and subsequently distilled of at 80° C. and 150° C. The addition of water and distillative removal of water was repeated again. The obtained concentrated composition was divided into two equal portions A and B.

Portion A: n-butanol was added at 80° C. until a viscosity of 7000 mPas was achieved. The free formaldehyde content was 0.31% by weight.

Portion B: n-butyl acetate was added at 80° C. until a viscosity of 7000 mPas was achieved. The free formaldehyde content was 0.08% by weight.

We claim:

1. A process for preparing a liquid composition of an etherified melamine formaldehyde resin, the process comprising:
   i. reacting melamine, formaldehyde and a primary $C_1$-$C_6$-alkanol at least temporarily under acidic conditions in the presence of an excess of the primary $C_1$-$C_6$-alkanol, which means that a molar amount of the primary $C_1$-$C_6$-alkanol employed in i. exceeds a molar amount of formaldehyde employed in i., to obtain a mixture of the etherified melamine formaldehyde resin, water, unreacted formaldehyde and unreacted primary $C_1$-$C_6$-alkanol;
   ii. distilling off at least 50% of the unreacted primary $C_1$-$C_6$-alkanol, unreacted formaldehyde and water comprised in the reaction mixture obtained in i., to obtain a concentrated composition of the etherified melamine formaldehyde resin;
   iii. diluting the concentrated composition of the etherified melamine formaldehyde resin by addition of at least one solvent; the at least one solvent being selected from the group consisting of water, a primary $C_1$-$C_6$-alkanol, a solvent B, and mixtures thereof, where the solvent B is selected from the group consisting of a $C_1$-$C_2$-alkoxy-$C_2$-$C_4$-alkanol, a secondary $C_3$-$C_6$-alkanol, a tertiary $C_4$-$C_6$-alkanol, an aliphatic monoketone having 3 to 8 carbon atoms, a cyclic monoketone having 5 to 8 carbon atoms, a $C_1$-$C_6$-alkyl ester of a $C_1$-$C_4$-alkanoic acid, a $C_1$-$C_2$-alkoxy-$C_2$-$C_4$-alkyl ester of a $C_1$-$C_4$-alkanoic acid and an aromatic hydrocarbon;
   wherein in iii. both of the following measures a) and b) are taken, where measure a) is performed first and then measure b) is taken:
   a) adding water or a mixture of water and at least one organic solvent, which is selected from the group consisting of water-miscible organic solvents B as defined herein and the primary $C_1$-$C_6$-alkanol and mixtures thereof, to the concentrated composition of the etherified melamine formaldehyde resin obtained in ii. and removing at least a major portion of the added water by evaporation under reduced pressure;
   b) subsequently adding at least one solvent thereby diluting the concentrated composition of the etherified melamine formaldehyde resin in iii., where the at least one solvent comprises at least 50% by weight, based on a total weight of solvent used, of at least one organic solvent B.

2. The process of claim 1, wherein the amount of water, which is added to the concentrated composition of the etherified melamine formaldehyde resin, is from 0.5 to 15% by weight of the concentrated composition of the etherified melamine formaldehyde resin.

3. The process of claim 1, wherein at least 80% of the water, which has been added to the concentrated composition of the etherified melamine formaldehyde resin, is removed by evaporation.

4. The process of claim 1, wherein the at least one solvent used for diluting the concentrated composition of the etherified melamine formaldehyde resin is an organic solvent comprising at least 50% by weight, based on a total weight of solvent used for dilution, of at least one organic solvent selected from the group consisting of an aliphatic monoketone having 3 to 8 carbon atoms, a cyclic monoketone having 5 to 8 carbon atoms, a $C_1$-$C_6$-alkyl ester of a $C_1$-$C_4$-alkanoic acid, a $C_1$-$C_2$-alkoxy-$C_2$-$C_4$-alkyl ester of a $C_1$-$C_4$-alkanoic acid and a methyl substituted benzene.

5. The process of claim 4, wherein the at least one solvent used for diluting the concentrated composition of the etherified melamine formaldehyde resin comprises at least 50% by weight, based on the total weight of solvent used for dilution, of at least one organic solvent selected from the group consisting of a $C_2$-$C_6$-alkyl ester of acetic acid, a methyl substituted benzene and a $C_1$-$C_2$-alkoxy-$C_2$-$C_4$-alkyl ester of acetic acid.

6. The process of claim 1, where in i) formaldehyde is used in an amount of from 2.5 to 12 mol per 1 mol of melamine.

7. The process of claim 1, where in i) the $C_1$-$C_6$-alkanol is used in an amount of from 5.0 to 50 mol per 1 mol of melamine.

8. The process of claim 1, where i) is performed at a pH in a range of from pH 2.0 to pH 6.0.

9. The process of claim 1, where i) is performed by heating a mixture of melamine, formaldehyde and the excess of the primary $C_1$-$C_6$-alkanol under acidic conditions.

10. The process of claim 1, where i) comprises
   i.1) heating a mixture of melamine, formaldehyde and a primary $C_1$-$C_6$-alkanol under acidic conditions, to obtain a first reaction mixture;
   i.2) distilling off at least a major portion of volatiles comprised by the first reaction mixture, to obtain a concentrated reaction mixture;
   i.3) adding primary $C_1$-$C_6$-alkanol to the concentrated reaction mixture and heating the thus obtained mixture under acidic conditions, to obtain a mixture of the etherified melamine formaldehyde resin, water and primary $C_1$-$C_6$-alkanol.

11. The process of claim 1, where in ii. the unreacted primary $C_1$-$C_6$-alkanol, unreacted formaldehyde and water are distilled off until a solid content of the concentrated composition is at least 80% by weight.

12. The process of claim 1, where in iii. the concentrated composition is diluted until a solid content of the liquid composition of the etherified melamine formaldehyde resin is in a range of from 50 to 98% by weight.

* * * * *